USO05613352A

United States Patent [19]
Panoushek et al.

[11] Patent Number: 5,613,352
[45] Date of Patent: *Mar. 25, 1997

[54] ELECTRONIC COMBINE HARVESTING HEAD STATUS DISPLAY SYSTEM

[75] Inventors: Dale W. Panoushek, Orion, Ill.; Jeffery S. Milender, Valley City, N. Dak.

[73] Assignee: Case Corporation, Racine, Wis.

[ * ] Notice: The term of this patent shall not extend beyond the expiration date of Pat. No. 5,465,560.

[21] Appl. No.: 555,295

[22] Filed: Nov. 8, 1995

Related U.S. Application Data

[63] Continuation of Ser. No. 265,675, Jun. 24, 1994, Pat. No. 5,465,560.
[51] Int. Cl.⁶ .......................... A01D 34/86; A01D 75/28
[52] U.S. Cl. .................. 56/10.2 E; 56/208; 56/DIG. 10; 56/DIG. 15
[58] Field of Search ................. 56/10.2 E, 208, 56/DIG. 3, DIG. 10, DIG. 15; 364/424

[56] References Cited

U.S. PATENT DOCUMENTS

| | | | |
|---|---|---|---|
| 4,180,966 | 1/1980 | Zen | 56/208 |
| 4,332,126 | 6/1982 | Van Auwelaer et al. | 56/10.2 |
| 4,437,295 | 3/1984 | Rock | 56/10.2 |
| 4,641,490 | 2/1987 | Wynn et al. | 56/10.2 |
| 5,155,984 | 10/1992 | Sheehan | 56/10.2 |
| 5,359,836 | 11/1994 | Zeuner et al. | 56/10.2 E |

OTHER PUBLICATIONS

SAE Technical Paper Series 941799 –Electro–Hydraulic Header Control for Combine Harvesters (Sep. 1994).

*Primary Examiner*—Terry Lee Melius
*Attorney, Agent, or Firm*—Foley & Lardner

[57] ABSTRACT

An electronic control system for controlling and displaying the status of the location of a combine harvesting head is disclosed herein. The system includes transducers for monitoring the position of the harvesting head relative to the combine, the location of the head relative to the surface upon which the combine is operating, and the force at which the surface is supporting the head. The system also includes a control unit coupled to the transducers and an electronic display located with the operator cab of combine. Depending upon the configuration of the control unit, the control unit samples the transducer signals to apply display signals to the display. In response to the display signals, the display can produce human-readable characters representative of the status of the head as monitored by the transducers.

22 Claims, 9 Drawing Sheets

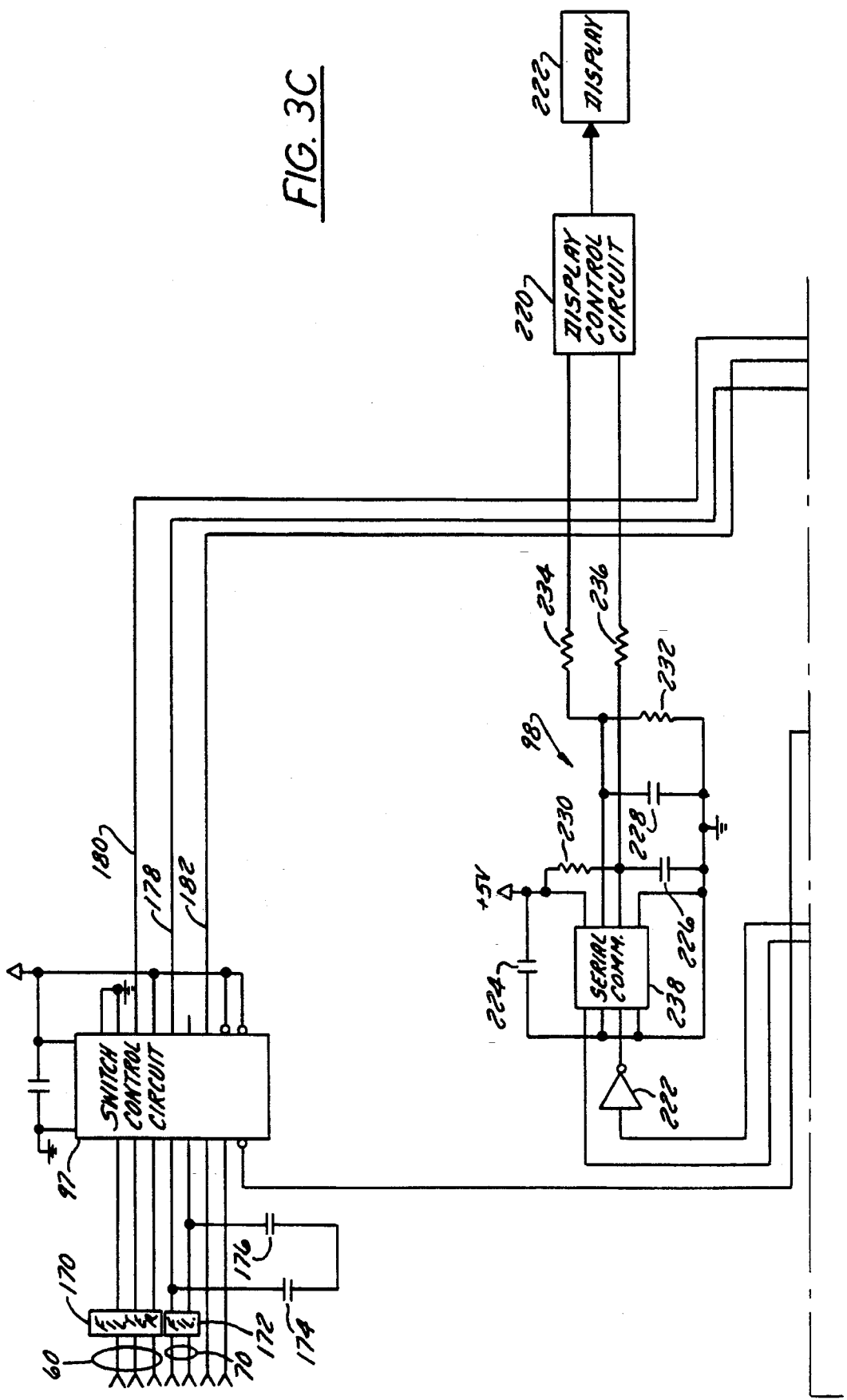

5,613,352

ELECTRONIC COMBINE HARVESTING HEAD STATUS DISPLAY SYSTEM

This is a continuation of U.S. Ser. No. 08/265,675 filed on Jun. 24, 1994 entitled ELECTRONIC COMBINE HARVESTING HEAD STATUS DISPLAY SYSTEM, now U.S. Pat. No. 5,465,560.

FIELD OF THE INVENTION

The present invention relates to an electronic control system for controlling the location of a combine harvesting head. In particular, the present invention relates to an electronic display located in the operator cab of the combine. The display communicates with the control system to produce alpha-numeric characters representative of the status of the location of the harvesting head.

BACKGROUND OF THE INVENTION

Systems for positioning harvesting heads relative to combines are generally known. These systems normally have hydraulic and electronic positioners which position the head based upon the distance of the head from the surface upon which the head is operating. In particular, the operator selects a desired operating position for the head and the positioner operates to maintain the head at the desired operating position. A few system provide mechanical arrangements (e.g. lever supported pointers moveable relative to a graduated scale) which the operator of the combine can view to determine the actual distance of the head from the surface. However, these systems do not provide electronic displays for displaying alpha-numeric data representative of the head position which the operator can readily view from within the combine cab.

Additionally, known head positioning controls do not position harvesting heads based a combination of the position of the head relative to the implement, the location of the head relative to the surface, and the force at which the surface supports the head. By providing this type of control, harvesting efficiency is improved by giving the combine operator more control over head positioning. However, to make this type of control easier for the operator to use, it is important to provide the operator with appropriate feedback. More specifically, position, location and force control of a head are improved when the operator can view a display which produced information representative of the position, location and force.

Accordingly, it would be desirable to provide an electronic harvesting head positioning system having position, location and/or force control, and an appropriate display device to provide the combine operator with an appropriate representation of position, location and/or force.

SUMMARY OF THE INVENTION

The present invention relates to an electronic display located within the interior of the operator cab of an agricultural vehicle such as a combine. The vehicle includes a support structure for supporting the cab, a harvesting implement, and an implement positioner coupled to the structure and the implement to move the implement relative to the vehicle in response to electric control signals. A position transducer mechanically coupled to the implement produces position signals, representative of the locations of the implement relative to the vehicle, applied to a control circuit. The control circuit monitors the position signals, applies display signals representative of the position signals to the display, and applies control signals to the implement positioner. The display displays human-recognizable characters representative of the location of the implement relative to the vehicle in response to the display signals.

Control of the display can be modified by replacing the position transducer with a transducer mechanically coupled to the implement to produce location signals representative of a relationship of the implement relative to the surface upon which the vehicle is operating. With this modification, the electronic display displays human-recognizable characters representative of the relationship of the implement relative to the surface. The relationship of the implement relative to the surface can be either the distance there between, or the force (pressure) at which the implement is supported by the surface.

Control of the display can be further modified by using the position transducer in combination with the transducer for producing signals representative of a relationship of the implement relative to the surface.

DETAILED DESCRIPTION OF THE PREFERRED EMBODIMENT

Figure 1:
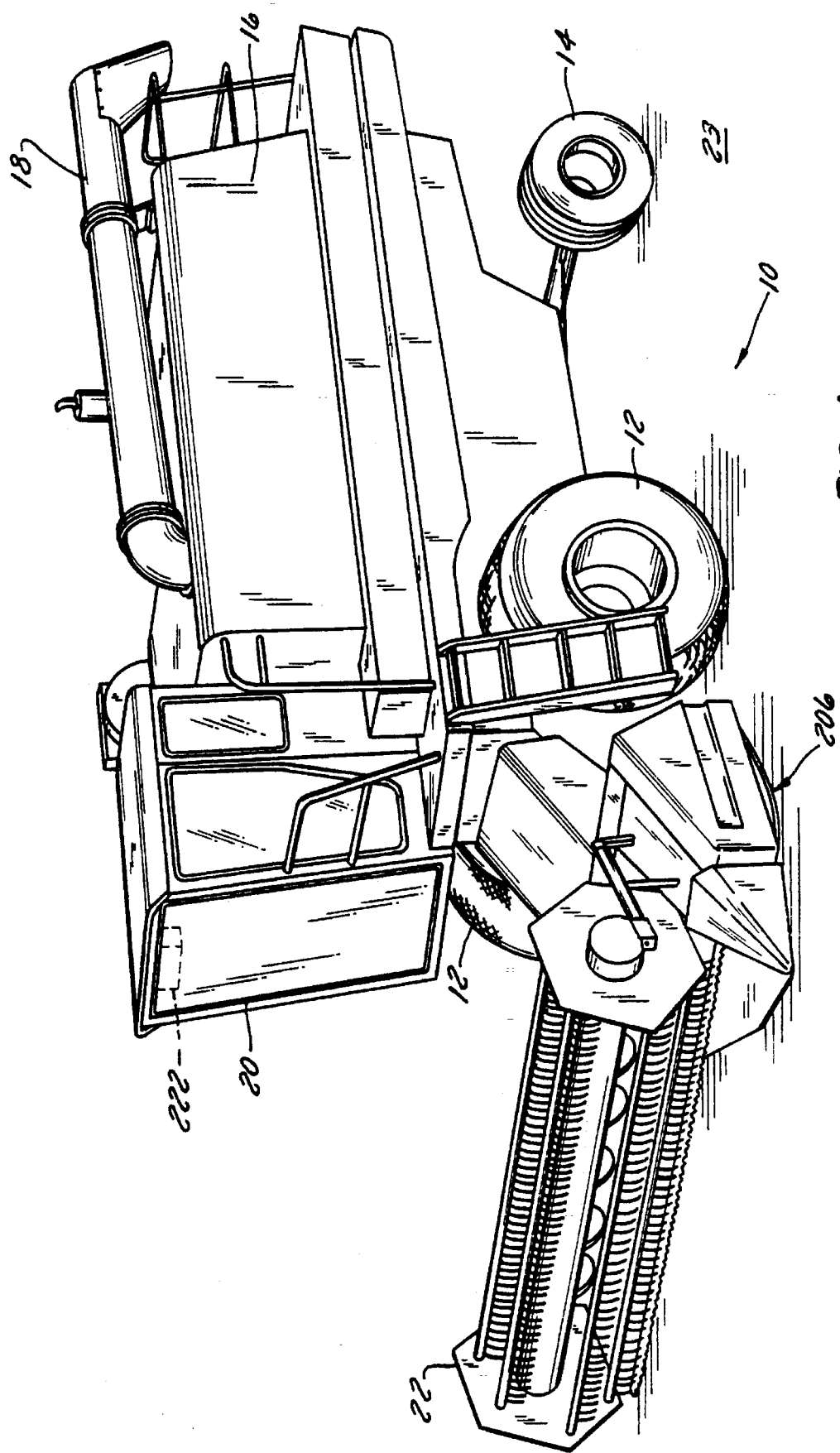
FIG. 1 illustrates an agricultural vehicle including a moveable harvesting implement.

Referring to FIG. 1, an agricultural vehicle 10 includes a pair of drive wheels 12 located at the front end of vehicle 10, a pair of steerable wheels 14 located at the rear end of vehicle 10, a machinery and grain storage compartment 16, a grain elevator and chute 18, an operator cab 20, and a support frame (structure) for joining and supporting the above-listed components. (By way of example only, vehicle 10 may be a combine of the type manufactured by Case Corporation having Model No. 1660.) Attached to the front end of the frame of vehicle 10 (i.e. the front-most end of vehicle 10 along its forward direction of travel during harvesting) is an implement 22 such as a grain harvesting head. (By way of example, implement 22 could be a Combine Corn Head Series 1000 sold by Case Corporation.) Implement 22 is positioned relative to vehicle 10 and/or the surface 23 upon which vehicle 10 is moving (i.e. the ground from which the respective plant related matter, grain or vegetation, is being harvested). To efficiently harvest the grain or vegetation, it is useful to provide control over the position or location of implement 22.

Figure 2:
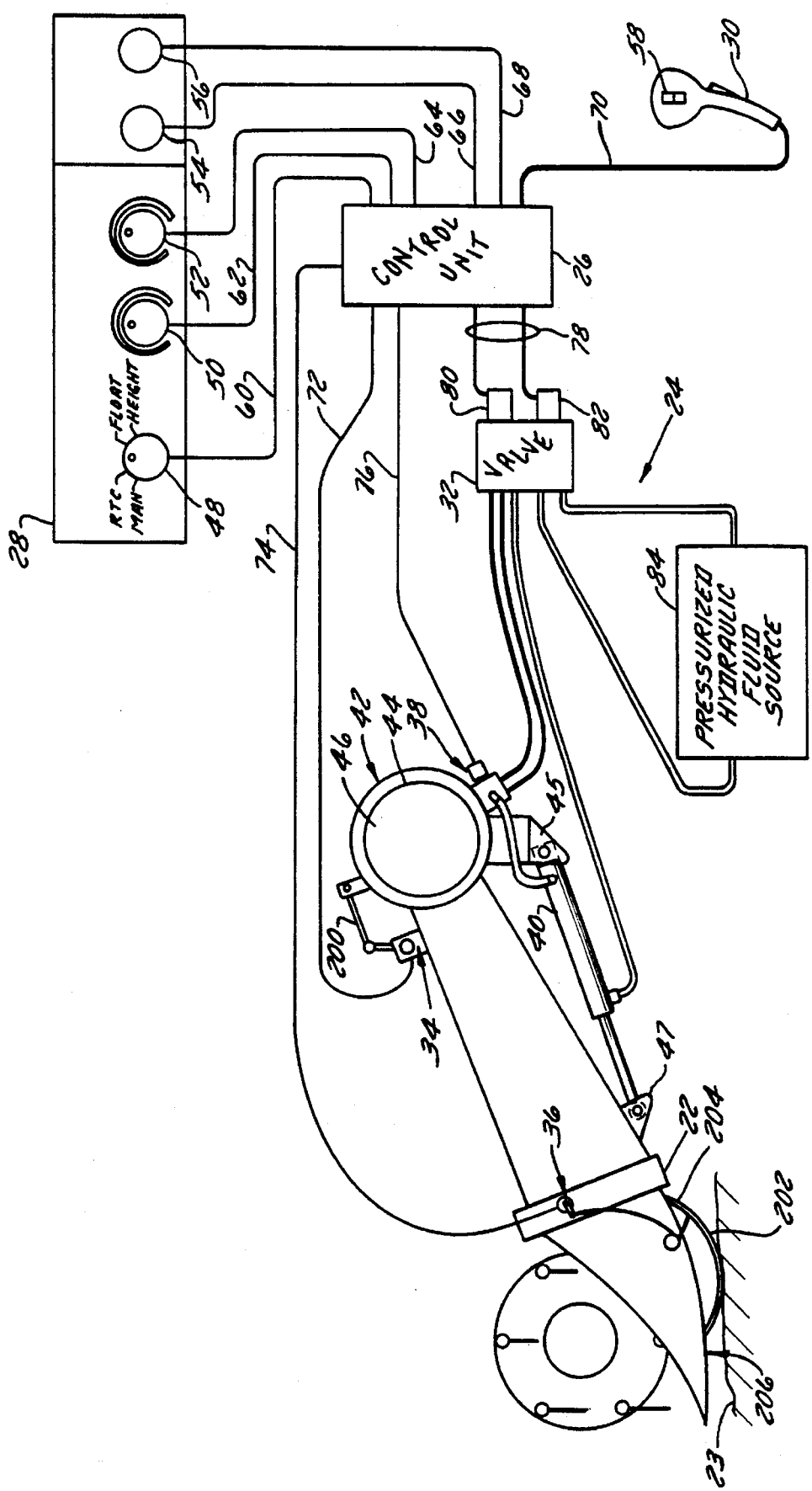
FIG. 2 is a schematic representation of the preferred embodiment of an implement position control system.

FIG. 2 is a schematic representation of the preferred embodiment of the implement 22 position control system 24. Control system 24 includes a microprocessor based control unit (circuit) 26, a man-controller interface 28, a vehicle direction and speed control lever 30, a hydraulic control valve 32, a position transducer 34, a location transducer 36, a pressure transducer 38, and an implement positioner (lift mechanism) 40 (e.g. hydraulic lift cylinders, cable lift arrangements, hydraulic motor and gear arrangements, or electric motor and gear arrangements). In the present embodiment, mechanism 40 includes hydraulic lift cylinders and transducers 34 and 36 are potentiometers.

However, transducers 34 and 36 could be replaced with LVDTs, and transducer 38 could be replaced by a current monitoring circuit if an electric motor were used in mechanism 40.

Implement 22 is rotatably supported relative to vehicle 10 by a bearing assembly 42. Bearing assembly 42 includes a fixed bearing portion 44 and a movable bearing portion 46 fastened to implement 22. Fixed bearing portion 44 is fastened to vehicle 10 and to attachment member 45, and control mechanism 40 is mounted between member 45 and a second attachment member 47 fixed to implement 22. In this arrangement, system 24 is operable to control mechanism 40 which moves (rotates) implement 22 relative to vehicle 10. By way of modification, implement 22 can be movably supported relative to vehicle 10 using other mechanical arrangements such as, for example, a parallelogram linkage arrangement which supports implement 22 and, during raising and lowering, guides implement 22 along a path which is generally perpendicular to surface 23.

Referring more specifically to system 24, interface 28 includes a mode switch 48, a reference position (location) signal generator 50, a reference pressure signal generator 52, a raise rate signal generator 54, and a lowering rate signal generator 56. In the present embodiment, generators 50, 52, 54 and 56 are potentiometers. However, generators 50, 52, 54 and 56 could be switches which are capable of producing digital signals representative of the associated positions, pressures and rates.

In addition to mode selector switch 48, system 24 also includes a raise and lower switch 58 which is mounted in lever 30. By way of example, raise and lower switch 58 is a centrally biased momentary contact switch. Switch 48 is coupled to unit 26 by a signal bus 60, generator 50 is coupled to unit 26 by a signal bus 62, generator 52 is coupled to unit 26 by a signal bus 64, generator 54 is coupled to unit 26 by a signal bus 66, generator 56 is coupled to unit 26 by a signal bus 68, and switch 58 is coupled to unit 26 by a signal bus 70.

Control unit 26 is also coupled to transducer 34 by a signal bus 72, transducer 36 by a signal bus 74, and transducer 38 by a signal bus 76. Control unit 26 is coupled to hydraulic control valve 32 by a signal bus 78. More specifically, control valve 32 includes a raise solenoid 80 and a lowering solenoid 82 to which signal bus 78 is connected. Control unit 26 applies pulse width modulated signals to solenoids 80 and 82 which allow valve 32 to control the flow of fluid between a pressurized hydraulic fluid source 84 and lift cylinders 40. In the present embodiment, source 84 is a hydraulic pump connected in series with a hydraulic fluid storage tank and appropriate filters.

Referring to FIG. 3 (3A, 3B, 3C) control unit 26 includes a digital processor 86 (microcontroller, e.g. Motorola 80C198) having an internal analog-to-digital converter 88, an analog-to-digital converter voltage reference source 90, a processor watchdog circuit 92, an analog signal filtering and isolation circuit 94, an analog multiplexer 96, a switch input control circuit 97, a serial communications interface 98, a memory and a programmed logic control and memory circuit 100 (e.g. psd-312 sold by Wafer Scale Integration or Phillips/Sygnetics), a pulse width signal generation circuit 102, and a non-volatile memory 104.

Voltage reference source 90 (FIG. 3B) includes resistors 106 and 108, capacitors 110, 112 and 114, and operational amplifier 116 coupled to the voltage reference and analog ground of processor 86 as shown. Source 90 operates to provide a voltage range for analog-to-digital converter 88 within which voltage signals are converted to digital values.

Processor watchdog circuit 92 (FIG. 3B) includes resistors 118, 120, 122, 123 and 124, capacitors 126, 128 and 130, diode 132, low voltage detector 134, inverter 136, and transistor 138 coupled to the reset of processor 86 as shown. Circuit 92 resets processor 86 when the power source 196 voltage falls below a predetermined level.

Analog multiplexer 96 (FIG. 3B) includes at least seven analog inputs which are selectively coupled to an analog output 166, which is in turn coupled to the input of isolation circuit 94. Signal buses 62, 64, 66, 68, 72, 74 and 76 are coupled to the analog inputs of multiplexer 96 by appropriate filtering circuits 152, 154, 156, 158, 160, 162 and 164, respectively. The analog inputs of multiplexer circuit 96 are selectively switched between the output 166 via a 4-bit data bus 168 which is coupled to the output of control circuit 100. Accordingly, processor 86 selectively controls the application of the signals from transducers 34, 36 and 38 and signal generators 50, 52, 54 and 56 to analog-to-digital converter 88 by applying the appropriate address signals to control circuit 100, which in turn applies the appropriate 4-bit signal to data bus 168 for selectively applying the desired analog signal to analog output 166.

Analog signal isolation circuit 94 (FIG. 3B) is coupled between output 166 of multiplexer 96 and one analog input of analog-to-digital converter 88 to provide filtering and isolation there between. Circuit 94 includes capacitors 140 and 142, operational amplifier 144, zener diode 146, diode 148 and resistor 150 coupled between output 166 and the analog input channel of analog-to-digital converter 88 as shown.

As an alternate to the use of multiplexer 96, multiplexer 96 could be eliminated by using an analog-to-digital converter 88 with a sufficient number of analog input channels to handle the analog input signals from transducers 34, 36 and 38 and signal generators 50, 52, 54 and 56. However, such an arrangement increases the amount of circuitry required for filtering and isolation since an isolation circuit 94 may be required for all of the analog input channels to analog-to-digital converter 88. Thus, where sufficient sampling speed is obtained by using multiplexer 96 and a signal analog channel input to analog-to-digital converter 88, circuitry can be conserved since only one isolation circuit 94 is necessary.

The statuses of switch 48 and switch 58 are monitored by processor 86 via switch input control circuit 97, coupled between switch 48 and circuit 97, and control circuit 100. More specifically, signal bus 60 includes three conductors which are coupled to circuit 97 via an appropriate filtering circuit 170. Mode selector switch 48 includes three contacts each connected to one of the three signal conductors of bus 60, and selectively connected to a reference voltage (e.g. 12 volts) upon the status (position) of mode selector switch 48. When a signal is not present on bus 60, switch 48 is assumed to be in the manual position. Signal bus 70 includes two conductors connected to contacts in raise and lower switch 58 which are selectively connected to the reference voltage, depending upon the status of switch 58 (e.g., when switch 58 is in the uppermost position, one conductor is connected to the reference voltage and when switch 58 is in the lowermost position, the other conductor is connected to the reference voltage). Signal bus 70 is coupled to control circuit 97 by a filtering circuit 172. In addition to filtering circuit 172, further filtering is provided by capacitors 174 and 176 coupled between the conductors of bus 70 and ground.

Processor 86, circuit 97 and circuit 100 cooperate to sequentially sample each of the conductors of signal buses 60 and 70. More specifically, circuit 97 operates as a storage and shift register to sample the statuses of the six signal conductors in signal buses 60 and 70. Subsequently circuit 97 shifts through the memory location associated with each conductor, and sequentially applies a logic level representative of the status of each conductor to output data line 178 in response to an input signal at input control line 180 and a clocking signal at clock conductor 182. By way of example, when control line 180 is HIGH, the register is cleared, and when control line 180 is LOW the statuses of the six signal conductors are stored in the register and the register is shifted left (or right depending upon the biasing of circuit 97) in response to each clock pulse on line 182. Circuit 97 is coupled to processor 86 to sequentially apply the logic levels representative of the statuses of the signal conductors of signal buses 60 and 70 to processor 86 via data line 178.

Figure 3A:
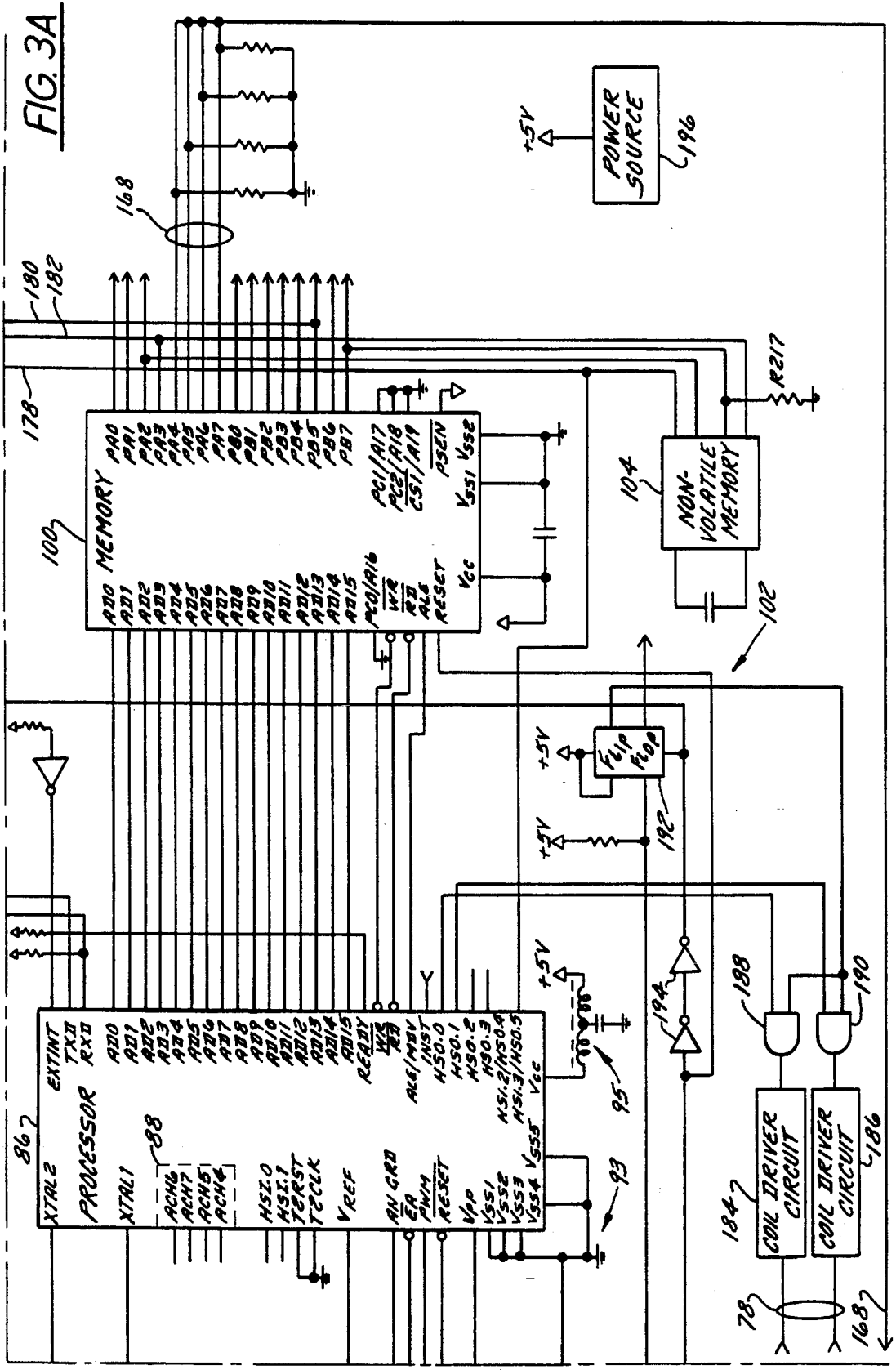
FIG. 3, including sheets 3A–3C, is a schematic diagram of the control system circuitry.

Pulse-width generation circuit 102 (FIG. 3A) includes a solenoid coil driver circuit 184 (raising), a solenoid coil driver circuit 186 (lowering), an AND gate 188, an AND gate 190, a flip flop 192, and a pair of inverters 194 with hysteresis coupled together and to processor 86 as shown in FIG. 3. Driver circuit 184 and 186 are conventional circuits for producing sufficient power to energize the coils of the raise solenoid 80 and the lowering solenoid 82 of control valve 32, respectively, based upon the output signals from AND gates 188 and 190, respectively.

The output of flip flop 192 is coupled to a first input of AND gates 188 and 190. Flip flop 192 is connected to the PWM pin of processor 86 and applies a logic HIGH signal to AND gates 188 and 190 at a frequency determined by the output of processor 86 applied to flip flop 192 (e.g. 100 Hz) with a selectable pulse width. The second input to AND gate 188 is coupled to one digital output of processor 86 and the second input of AND gate 190 is coupled to another output of processor 86 to select one of circuits 184 or 186. The width of the 100 Hz signal applied to coil driver circuits 184 and 186 from gates 188 and 189, respectively, is varied to control the speed at which lift cylinders 40 are extended and contracted (i.e., the rate of fluid flow from fluid source 84 to lift cylinders 40 depends upon the width of the pulse, where zero width means no movement of cylinders 40 and maximum pulse width means movement of cylinders 40 at their maximum speed), respectively. As a result, the speed at which implement 22 can be raised and lowered can be varied by varying the width of the pulse width modulated signal applied to solenoids 80 and 82 by coil driver circuits 184 and 186, respectively.

Figure 3B:
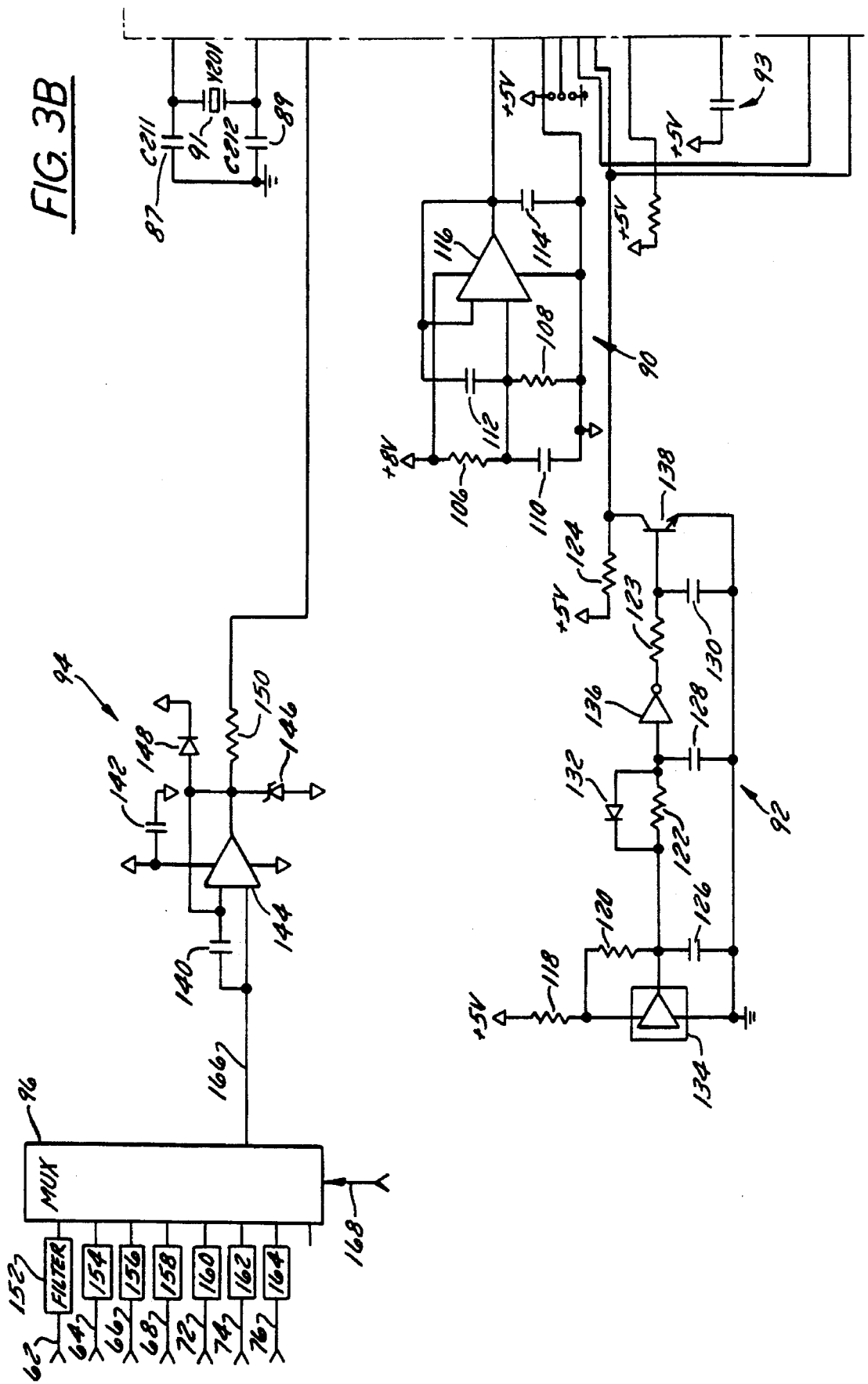
Figure 4A:
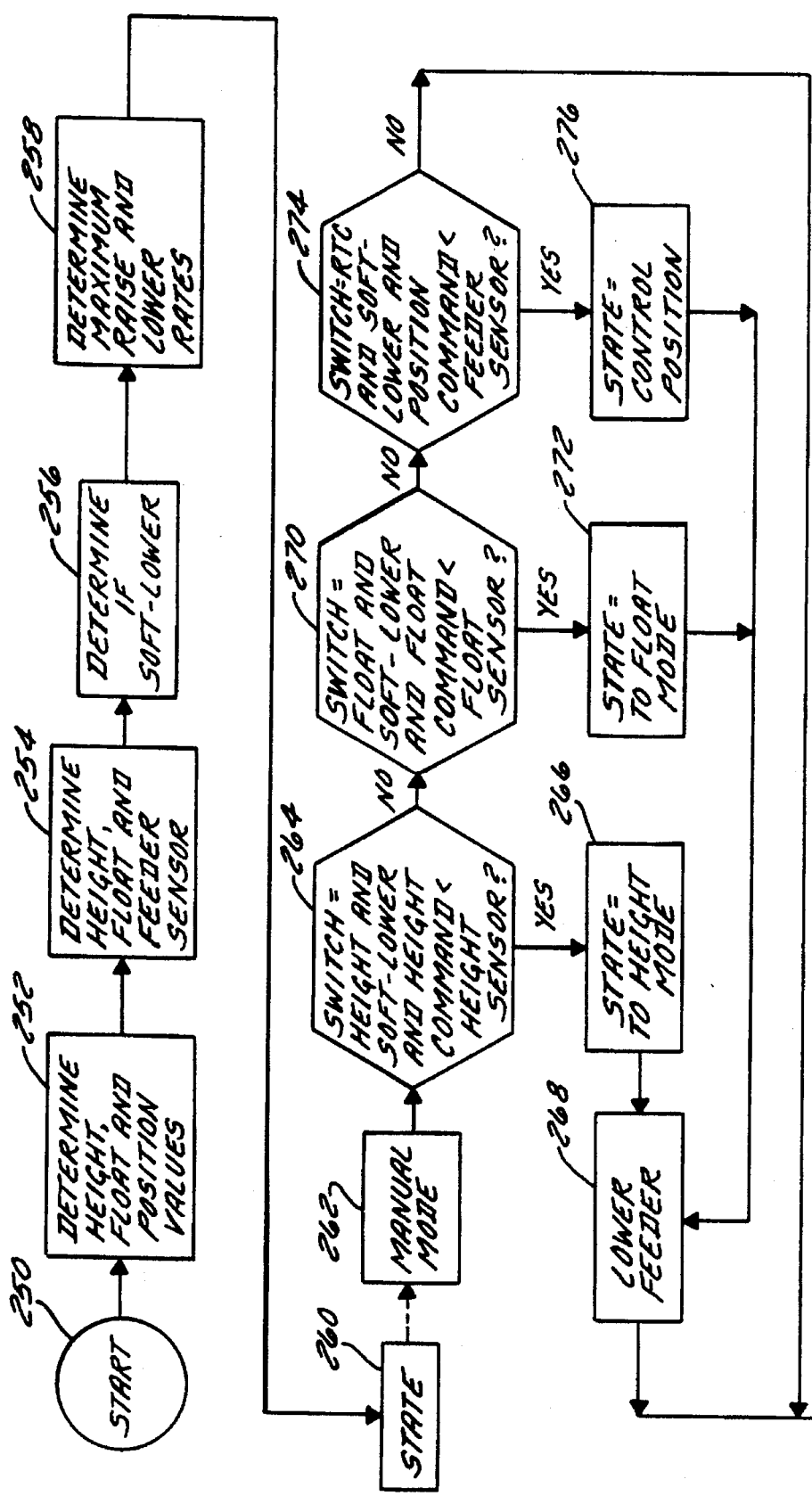
FIG. 4, including sheets 4A–4D, is a flow chart representative of the programming for the control system.
Figure 4B:
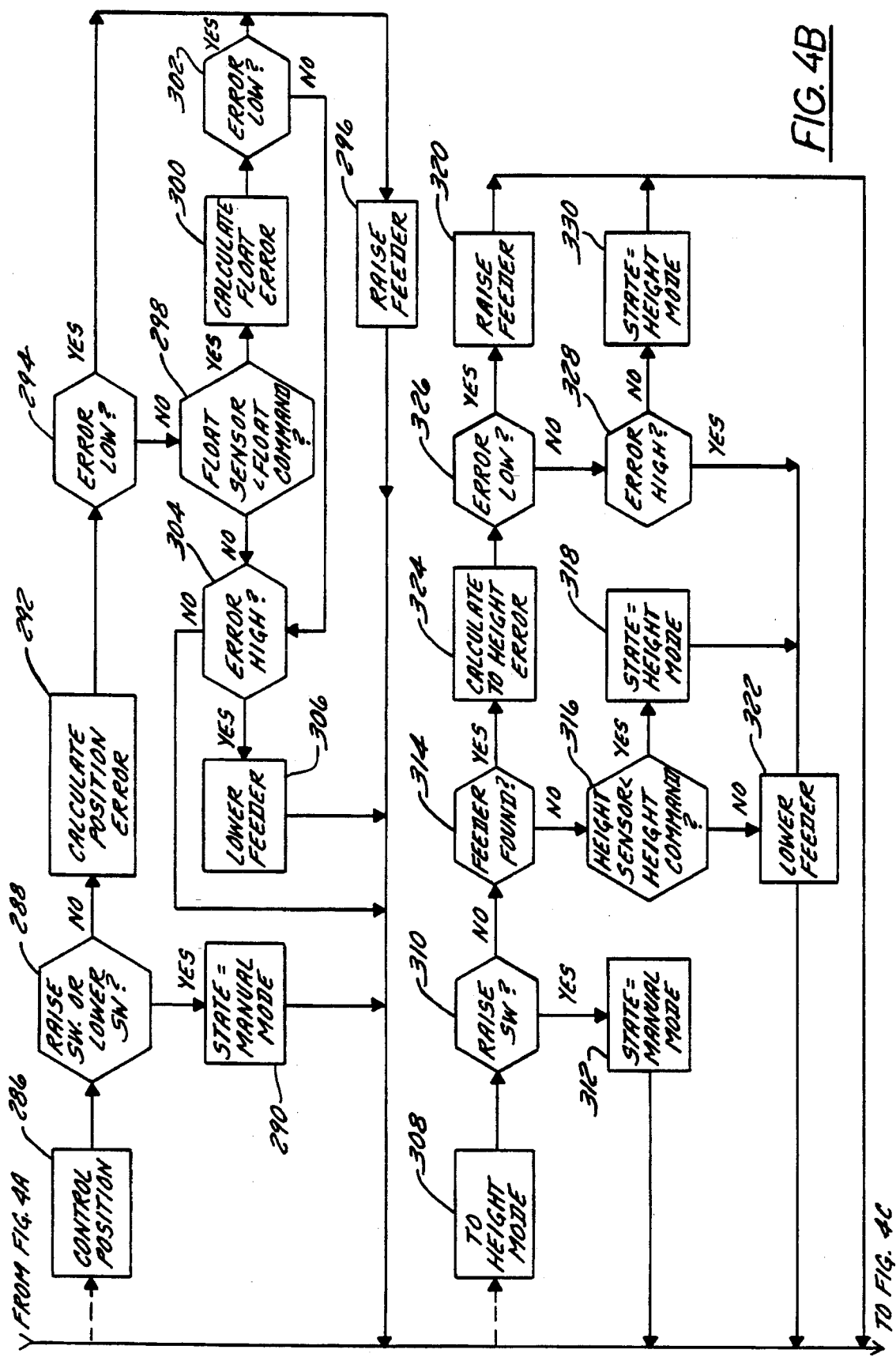
Figure 4C:
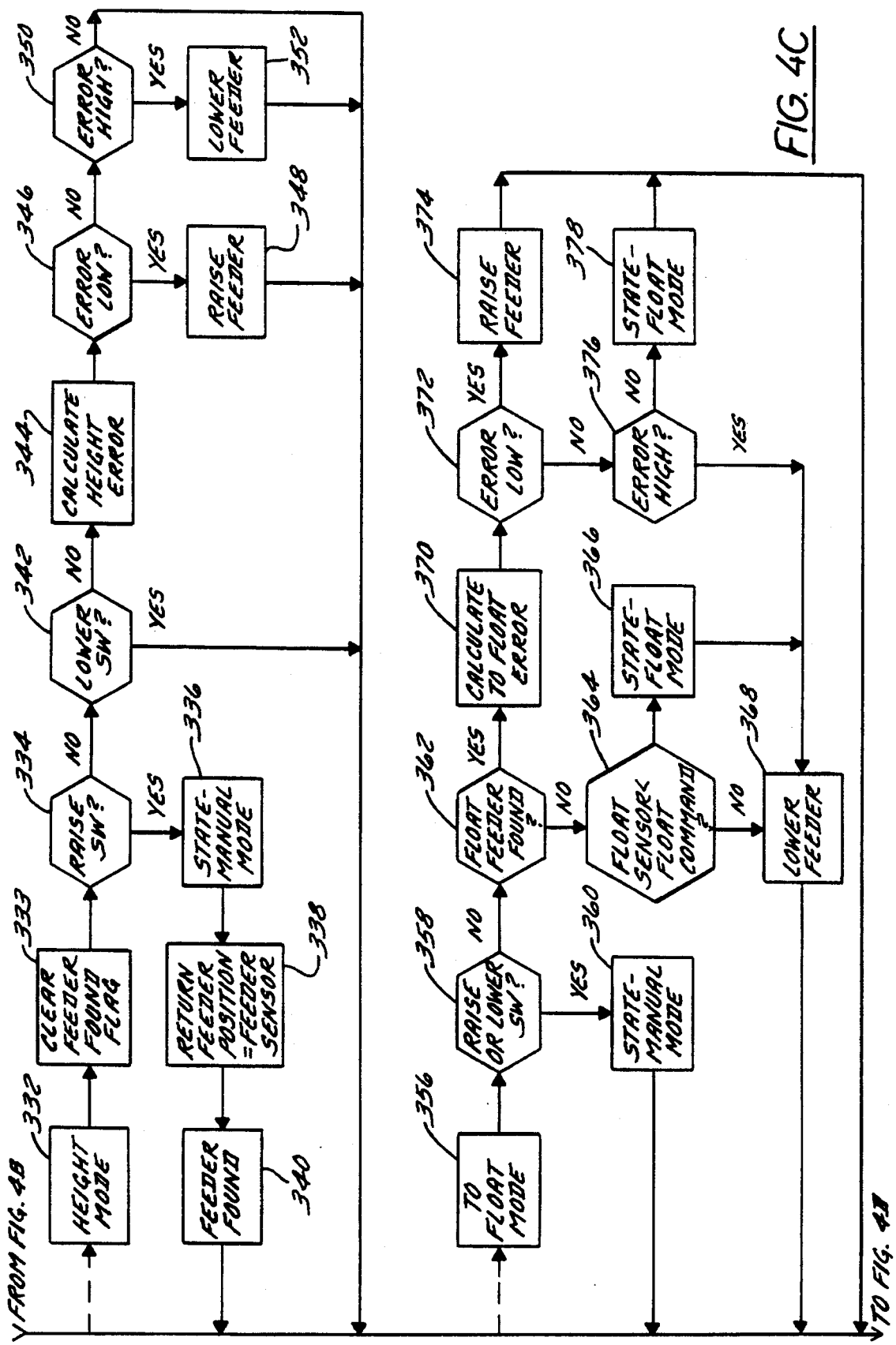
Figure 4D:
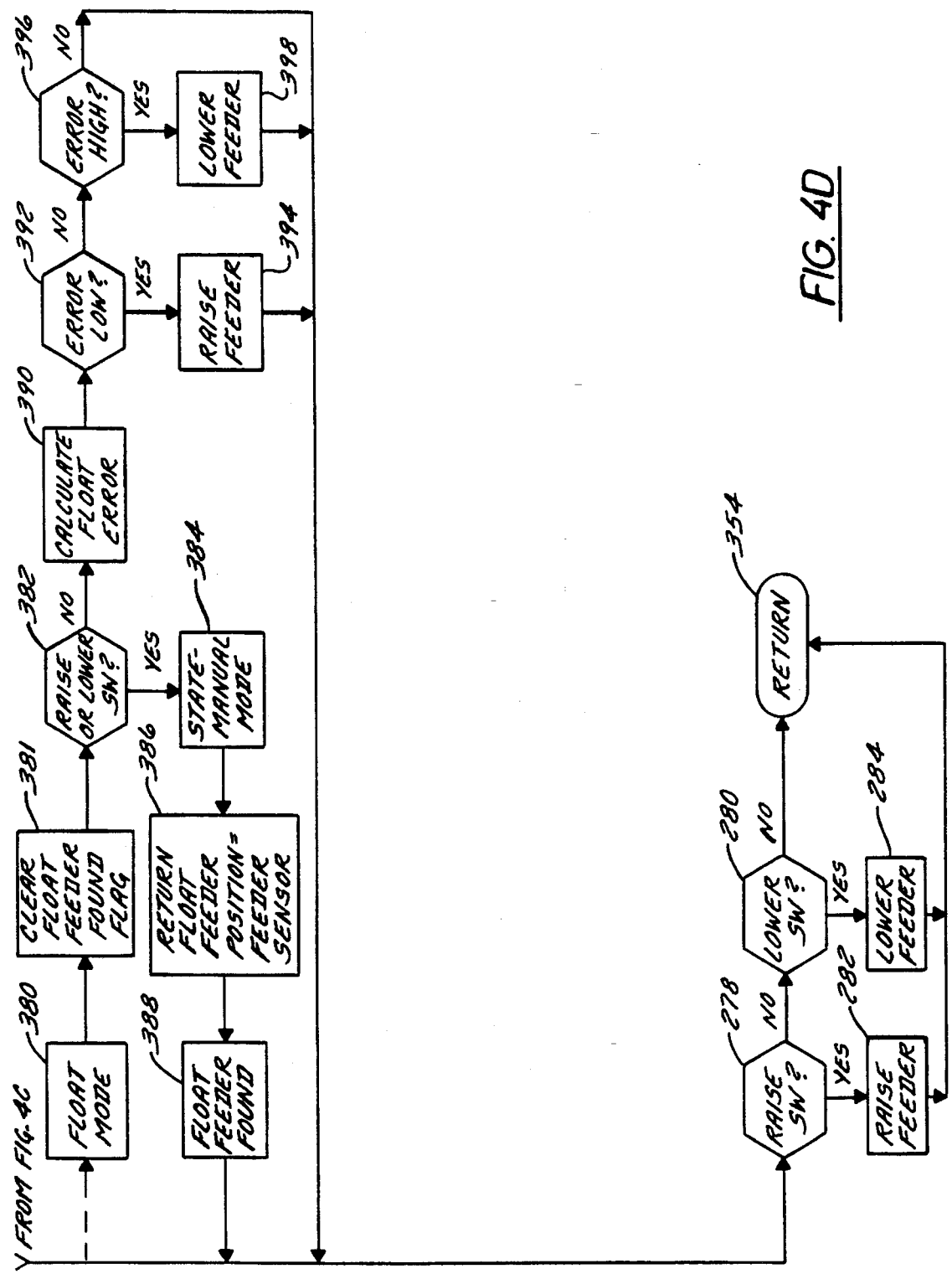

Power for control unit 26 is provided from a conventional 5 V power source 196. By way of example, power source 196 may include a 5 V voltage regulator and appropriate filtering coupled to the battery of vehicle 10. Power from source 196 is provided to processor 86 via filtering circuits 93 and 95. The clocking for processor 86 is provided by capacitors 87 and 89, and crystal 91 coupled together as shown in FIG. 3B.

Serial communications interface 98 (FIG. 3C) is provided to permit communication between control circuit 26 and other control systems of vehicle 10. For example, interface 98 is configured to communicate with a display control circuit 220 configured to drive an alpha-numeric display 222 such as a LCD display. Interface 98 includes an inverter with hysteresis 223, capacitors 224, 226 and 228, resistors 230, 232, 234 and 236, and serial communication chip 238 (e.g. LT 1485N serial chip) coupled together between the transmit and receive pins of processor 86 and display control circuit 220 as illustrated in FIG. 3. Display control circuit 220 is configured to format data transmitted from processor 86 by interface 98 to circuit 220 so that such data is capable of producing the appropriate characters on display 222 located (e.g. within cab 20, see FIG. 1) for viewing by the combine operator from within cab 20. By way of example, display 222 may have four seven-segment characters and a decimal point between three of the characters and the fourth character. Alternatively, display 222 may also include icons and text segments in addition to the character segments.

In one embodiment of system 24, processor 86 is configured (programmed) to transmit data representative of the position of implement 22 as monitored by potentiometer 34 to display control circuit 220 via interface 98. In response to this data, circuit 220 controls display 222 to produce a displayed value representative of the positional relationship between implement 22 and vehicle 10. Processor 86 is programmed to convert the position signal produced by potentiometer 34 to data for controlling display 222 to display the height of implement 22 in inches or centimeters.

Processor 86 can also be programmed to transmit data to display control circuit 220 which is representative of the signal produced by potentiometer 36 which is in turn representative of the location of implement 22 relative to the ground surface 23. In response to this data, control circuit 220 controls display 222 to display a numerical value representative of the distance between bottom surface 206 of implement 22 and ground surface 23 (e.g. a distance having units of inches or centimeters).

Additionally, processor 86 may also be programmed to transmit data representative of the force (e.g. pounds or neutrons) being exerted by mechanism 40 on implement 22 to control circuit 220 via interface 98. In particular, processor 86 monitors transducer 38 and converts the hydraulic pressure into data representative of the float force required to maintain the position of implement 22 relative to vehicle 10 or ground surface 23. This data is utilized by control circuit 220 to produce a number representative of the force on display 222. By way of example, the force may be displayed as a percentage of the pressure when implement 22 is fully supported by surface 23 or mechanism 40.

Depending upon the application, processor 86 may be programmed to produce display data representative of one or more of the locations of implement 22 relative to vehicle 10, the distance of implement 22 relative to surface 23, or the force applied to implement 22. Where more than one type of data is displayed, the icons and/or text segments can be controlled to inform the operator of the type of data being displayed. System 24 may be calibrated by setting high and low positions of implement 22 relative to vehicle 10, high and low locations relative to surface 23, and high and low forces applied by mechanism 40 by moving implement 22 between the desired positions and locations, and by applying a range of forces while in a calibration mode. Furthermore, processor 86 may be programmed to permit calibration of a range for the display data.

The interaction of control circuit 26 with valve 32 for controlling the raising and lowering of implement 22 is described in detail below in reference to FIG. 4. The programming which configures (programs) processor 86 to provide appropriate control of the position of implement 22, also described in reference to FIG. 4, is stored in memory circuit 100. In general, control unit 26 controls the position of implement 22 based upon the position (setting) of selector switch 48, the status of switch 58, the digital values produced by analog-to-digital converter 88 representative of the settings of generators 50, 52, 54 and 56, and the analog signals produced by transducers 34, 36 and 38.

As discussed above, transducers 34 and 36 are potentiometers in the present embodiment. Potentiometer 34 is mechanically coupled to a linkage arrangement 200 which rotates the wiper of potentiometer 34 to produce a voltage representative of the positional relationship between implement 22 and vehicle 10. Potentiometer 36 is mechanically coupled to a location sensor skid 202, located generally at the center of implement 22, and to a cable arrangement 204 which move the wiper of potentiometer 36 based upon the distance between the bottom 206 of implement 22 and the surface 23 upon which skid 202 is resting. This arrangement of potentiometer 36, skid 202 and cable arrangement 204 produces a voltage representative of the distance between bottom 206 and surface 23. Alternatively, depending upon the application, another type of proximity sensor such as an ultrasound sensor could be substituted for potentiometer 36, skid 202 and cable assembly 204 to produce a signal representative of the distance between bottom 206 and surface 23.

In the present embodiment, transducer 38 is a pressure transducer which communicates with the fluid conduit which pressurizes lift cylinder 40 to raise implement 22. This arrangement of pressure transducer 38 produces a signal representative of the force being applied to implement 22 for example, equal to some minimum value when the full weight of implement 22 is not being supported by surface 23.

System 24 can operate in a manual mode, return to cut (RTC) mode, a float mode, and a height mode. In the manual mode, system 24 moves implement 22 up and down in response to the operation of switch 58. In the height mode, system 24 maintains implement 22 at a selected location relative to surface 23. In the float mode, system 24 maintains implement 22 at a selected contact pressure with surface 23. In the RTC mode, system 24 allows the user to raise implement 22 from a predetermined position by toggling switch 58 upward (typically at the end of a row in a field) and then automatically return to the position by toggling switch 58 downward (typically at the beginning of a row in the field).

FIG. 4 (4A, 4B, 4C, 4D) illustrates the sequence of steps which processor 86 is programmed (configured) to carry out while operating in one of the manual, RTC, float or height modes. Each time processor 86 completes the sequence of steps specified by FIG. 4, processor 86 clocks the first inputs of AND gates 188 and 190 (FIG. 3), and applies the appropriate pulse-width signal to the other inputs of AND gates 188 and 190. For example, if upon executing all of the instructions associated with the flow chart of FIG. 4, a decision is made to raise implement 22, 0 width pulses would be applied to AND gate 190 so that coil driver circuit 186 is inoperative, and pulses of appropriate widths would be applied to AND gate 188 to cause coil driver circuit 184 to open valve 32. In response, valve 32 applies pressurized fluid to lift cylinders 40 to raise implement 22.

As discussed in detail below, when implement 22 is moved by system 24, the speed of movement is based upon the difference between the selected position and the desired position, the selected height and the actual height, or the selected float pressure and the actual float pressure (e.g., proportional control). Thus, when the difference is large, the error is large, and the width of the pulses applied to the appropriate AND gate 188 or 190 is correspondingly large. As the implement is moved toward the desired position, height location or float position, the error is reduced, the width of the pulses applied to the appropriate AND gate 188 or 190 is reduced to slow the speed at which implement 22 is moved, and the speed of implement 22 goes to zero when the desired setpoint is reached.

In operation, processor 86 samples the status of selector switch 48 via shift register 97 and circuit 100 to determine the mode of operation for system 24 (step 250, startup). Next, processor 86 determines the digital value associated with signal generators 50 and 52 (step 252). The analog values produced by generators 50 and 52 are applied to analog-to-digital converter 88 via multiplexer 96 and filtering circuit 94. Depending upon the mode selected at switch 48, processor 86 stores the digital value produced by analog-to-digital converter 88 representative of the position of generator 50 as the desired height or position value, and the digital value produced by converter 88 representative of the position of generator 52 as the desired float value.

In step 254, processor 86 controls multiplexer 96 via databus 168 to apply the signals produced by potentiometers 34 and 36, and transducer 38, to converter 88 via multiplexer 96 and isolation circuit 94. Upon applying the respective signals produced by transducers 34, 36 and 38 to converter 88, the digital values produced by converter 88 are stored by processor 86 in the memory of circuit 100.

In step 256, processor 86 determines if momentary switch 58 has been momentarily actuated to the lower most position (e.g. 0.1–0.6 seconds). If such a condition has occurred, soft-lower flag is set. In step 258, processor 86 controls multiplexer 96 via bus 168 to apply the analog signals produced by generators 54 (maximum raise rate signal, e.g. 2–10 seconds for implement 22 raising) and generator 56 (maximum lower rate signal, e.g. 2–10 seconds for implement 22 lowering) to analog-to-digital converter 88 via filtering circuit 94. Processor 86 stores the digital values produced by converter 88 representative of the maximum raise and lower rates in circuit 100. Based upon the maximum raise and lower rate signals, processor 86 calculates and stores acceleration and deceleration values representative of the accelerations between zero speed of implement 22 and the selected raise and lower rates. By appropriately accelerating and decelerating implement 22 via control unit 26, relatively smooth motion of implement 22 is achieved even though hydraulic accumulators are either eliminated from system 24 or reduced in size.

The raise and lower rate acceleration values are stored as values which progressively increase to the maximum raise/lower rate values, and the raise and lower rate deceleration values are stored as values which progressively decrease from the maximum raise/lower rate values to zero. The acceleration values are used by processor 86 to increase (ramp up) the pulse widths from zero to the maximum associated with the maximum rate during the acceleration period for implement 22 (e.g. 0.1–0.5 seconds), and the deceleration values are used by processor 86 to decrease (ramp down) the pulse widths from the maximum to zero during the period of deceleration of implement 22 (e.g. 0.1–0.5 seconds).

In step 260, processor 86 reads data stored in memory 100 representative of the state (selected mode) of switch 48 and executes the subroutine associated with the selected mode. In step 262, processor 86 defaults to the manual mode. In step 264, if switch 48 is set to the height mode, if the soft lower flag is set, and if the desired height value as generated by generator 50 is less than the height value sensed at potentiometer 36, processor 86 sets a flag for the "to height mode" subroutine (step 266) and the lower feeder subroutine is called (step 268). The lower feeder subroutine sets the width of the pulses applied to valve 32 for lowering implement 22 based upon pressure or position error or a fixed width based upon the setting of generator 56 when in the manual mode.

If switch 48 is not set to the height mode or the desired height value is greater than the height value representative of the signal from potentiometer 36, processor 86 executes step 270. In step 270, if switch 48 is set to the float mode, if the soft lower flag is set, and if the desired float value produced by generator 52 is less than the sensed float value produced by transducer 38, processor 86 sets a flag for the "to float mode" subroutine (step 272) and the lower feeder subroutine is called (step 268). It should be noted that the sensed float value referred to here corresponds to the pressure in cylinders 40 required to support implement 22. Thus, lowering implement 22 has the effect of lowering the sensed float value by allowing implement 22 to be supported to a greater degree by surface 23. If switch 48 is not set to the float mode, or the desired float value is greater than the value representative of the signal produced by transducer 38, processor 86 executes step 274.

In step 274, processor 86 determines if switch 48 is set to the RTC mode, if the soft lower flag is set, and if the desired position value representative of the signal produced by generator 50 is less than the feeder position value representative of the signal produced by potentiometer 34, processor 86 sets the control position subroutine flag (step 276) and the lower feeder subroutine is called (step 268). If any of the conditions in step 274 are not true, processor 86 defaults to the manual mode and samples the status of switch 58 to determine if switch 58 has been toggled to the raise or lower position (steps 278 and 280). If switch 58 is in the raise position, the raise feeder subroutine is called (step 282), and if switch 58 is in the lower position, the lower feeder subroutine is called (step 284). The raise feeder subroutine sets the width of the pulses applied to valve 32 for raising implement 22 based upon position error, or a fixed width when in the manual mode.

While system 24 is operating in the return to cut mode, and implement 22 is operating in the position selected for cutting, as represented by the signal produced by generator 50, the "control position" subroutine is executed by processor 86. In step 286, processor 86 begins executing the "control position" subroutine. In step 288, switch 58 is sampled to determine whether or not the operator is attempting to manually control the location of implement 22. If switch 58 has been operated, processor 86 goes into the manual mode and executes a combination of steps 278, 280, 282 and 284 (step 290). If switch 58 was not operated, processor 86 calculates the difference between the desired position value and the position value representative of the signal generated by potentiometer 34 to produce a position error value (step 292). If the position error indicates that implement 22 is too low (step 294), the raise feeder subroutine is called (step 296). If processor 86 determines that implement 22 is not too low (error high), processor 86 compares the desired float sensor value to the float sensor value representative of the signal produced by pressure transducer 38 (step 298). If processor 86 determines that the float error represents a float pressure lower than the desired pressure (steps 300 and 302, again referring to the pressure or force by surface 23 tending to raise implement 22, i.e. a surface 23 support force greater than the desired support force), the raise feeder subroutine is called (step 296). If processor 86 calculates a float error which represents that the float pressure is higher than the desired float pressure (step 304), the lower feeder subroutine is called (step 306). Upon completion of the control position routine, switch 58 is again sampled by processor 86 (steps 278 and 280) and the raise and lower feeders subroutines are appropriately called (steps 282 and 284). (Steps 298, 300, 302, 304 and 306 provide float control override of position control.)

The "to height mode" subroutine (step 308) is entered when the height mode has been set in step 266 as discussed above. In the "to height mode" subroutine, switch 58 is sampled (step 310) and if the raised position of switch 58 has been toggled, processor 86 goes into the manual mode and executes a combination of steps 278–284 (step 312). In step 314, processor 86 determines whether or not a setting is present in memory 100 representative of the position of implement 22 associated with a particular height setpoint value (i.e. feeder found flag is set) as determined in step 252. Upon startup of vehicle 10, a position value associated with the desired height value will not be present in memory 100. When a position value is not available (i.e. the feeder found flag is not set), processor 86 determines the difference between the desired height value representative of the position of generator 50 and the actual height value representative of the value produced by potentiometer 36 (step 316).

In step 314, when a position value associated with the height value is not available, a flag is set by processor 86 to reduce the size of the pulse widths applied to AND gates 188 or 190. This is done so that implement 22 is moved relatively slowly while being moved toward the desired height. This prevents jerking of implement 22 since skid 202, linkage 204 and potentiometer 36 do not begin producing a meaningful signal until skid 202 comes in contact with the ground. In step 316, if the height value representative of the signal at potentiometer 36 is greater than the desired height value representative of the signal produced by generator 50, the lower feeder subroutine is called (step 322). When the sensed height value is less than the desired height value, the height mode flag is set (step 318).

If processor 86 determines that a position value associated with the desired height value is stored in memory 100, processor 86 calculates the error between the position value representative of the signal produced by potentiometer 34 and the position value associated with the desired height (step 324). In step 326, the processor calls the raise feeder subroutine (step 320) if the error represents the location of implement 22 which is too low for the associated height, and in step 328, if the error is high, calls the lower feeder subroutine (step 322). If the error is neither high nor low, processor 86 sets the height mode flag (step 330). In general, while running the "to height subroutine," processor 86 controls the operation of lift cylinders 40 using potentiometer 34 (i.e. position control) until implement 22 is at a position within a range defined by high and low error bands (e.g. within ±1.5% to 2% of the desired position) at which time processor 86 enters the height mode subroutine (step 332) to begin controlling the location of implement 22 relative to surface 23 based upon the signal generated by potentiometer 36 (i.e. height or location control).

The "height mode" (step 332) subroutine is entered in response to processor 86 setting a height mode flag in steps 318 or 330. In step 333 the feeder found flag is cleared. In step 334, processor 86 determines whether or not switch 58 has been toggled to the raise position. If switch 58 has been toggled to the raise position, then processor 86 goes into the manual mode (step 336) and sets the feeder position value associated with the desired height stored in memory 100 to the position value representative of the signal produced by potentiometer 34 (step 338). In step 340, processor 86 sets a feeder found flag which is tested by processor 86 in step 314 to determine whether or not a position value representative of the desired height is stored in memory 100. In step 334 if switch 58 has not been toggled to the raise position, processor 86 determines if switch 58 has been toggled to the lower position (step 342). If switch 58 has been toggled to the lower position, the lower feeder subroutine is called in step 284. If switch 58 has not been toggled to the lower position, processor 86 samples the height value representative of the signal produced by potentiometer 36, compares this actual height value to the desired height value representative of the signal produced by generator 50, and calculates a height error value (step 344). If the error value indicates that implement 22 is too low, the raise feeder subroutine is called (step 346 and 348), if the error signal indicates that implement 22 is too high, the lower feeder subroutine is called (steps 350 and 352). If the error calculated is between the low error value (step 346) and the high error value (step 350), processor 86 does not call either the raise or lower feeder subroutines. After steps 340, 342, 348 or 352 have been executed, processor 86 samples the status of switch 58 at steps 278 and 280, and returns to the start of the program (step 254).

The "to float mode" subroutine (step 356) is entered in response to the setting of the "to float mode" flag at step 272 discussed above. In the "to float mode," switch 58 is sampled (step 358) and if the raised position of switch 58 has been toggled, processor 86 goes into the manual mode and executes a combination of steps 278–284 (step 360). In step 362, processor 86 determines whether or not a setting is present in memory 100 representative of the position of implement 22 associated with a particular float setpoint value (i.e. checks the float feeder found flag). (Upon startup of vehicle 10, a position value associated with the desired float value will not be present in memory 100.) Where a position value is not available, processor 86 determines the difference between the desired float value representative of the position of generator 52 and the actual float value representative of the signal produced by pressure transducer 38 (step 364).

In step 362, when a position value associated with the float value is not found (i.e. float feeder found flag set), a flag is set by processor 86 to reduce the size of the pulse widths applied to AND gates 188 or 190 during the execution of the lower feeder flag subroutine. This is done so that implement 22 is moved relatively slowly while being moved toward the desired float pressure. This reduces jerking of implement 22 since the float value representative of the signal produced by transducer 38 changes abruptly when bottom 206 of implement 22 comes in contact with the ground. If the sensed float value is greater than the desired float value, the lower feeder subroutine is called (step 368). In step 364, if the float value representative of the signal at transducer 38 ("sensed float value") is less than the desired float value representative of the signal produced by generator 52, the float mode flag is set (step 366).

If processor 86 determines that a position value associated with the desired float value is stored in memory 100 (i.e. float feeder found flag set), processor 86 calculates the error between the position value representative of the signal produced by potentiometer 34 and the position value associated with the desired float value (step 370). In step 372, processor 86 calls the raise feeder subroutine (step 374) if the error represents the location of implement 22 which is too low for the associated float value. In step 376, if the error is high, the processor 86 goes to step 368 to call the lower feeder subroutine. If the error is between the high and low limit values, processor 86 sets the float mode flag (step 378).

In general, while running the "to float mode" subroutine, processor 86 controls the operation of lift cylinders 40 using potentiometer 34 until implement 22 is at a position within a range defined by the high and low error values associated with the selected float pressure. Subsequently, processor 86 can enter the "float mode" subroutine to begin controlling the location of implement 22 relative to surface 23 based upon the signal generated by transducer 38 (float control).

The "float mode" (step 380) subroutine is entered in response to processor 86 setting a float mode flag in steps 366 or 378. In step 381 the float feeder found flag is cleared. In step 382, processor 86 determines whether or not switch 58 has been toggled to the raise or lower position. If switch 58 has been toggled to the raise or lower position, then processor 86 goes into the manual mode (step 384) and sets the feeder position value associated with the desired float to the position value representative of the signal produced by transducer 34 (step 386). Processor 86 then sets a float feeder found flag (step 388) which is tested by processor 86 in subsequent loops through the program at step 362 to determine whether or not a position value associated with the desired float value is stored in memory 100.

If switch 58 has not been toggled, processor 86 samples the float value representative of the signal produced by transducer 38, compares the float value to the desired float value representative of the signal produced by generator 52, and calculates a float error value (step 390). If the error value indicates that implement 22 is too low (i.e. that the pressure currently exerted to support implement 22 is too low), the raise feeder subroutine is called (steps 392 and 394), if the error signal indicates that implement 22 is too high (i.e. that cylinders 40 are currently supporting implement 22 to an extent greater than desired), the lower feeder subroutine is called (steps 396 and 398). If the error calculated is between a low error value (step 392) and a high error value (step 396), processor 86 does not call either the raise or lower feeder subroutine. After processor 86 samples the status of switch 58 at steps 278 and 280, processor 86 returns to the start of the program (step 254).

Upon reaching step 354 (FIG. 4D), processor 86 will have calculated a pulse width, and stored the values of the pulse width in memory 100. The maximum width of the pulse width value for raising and lowering implement 22 via the control of lifting cylinders 40 by control valve 32 is determined by processor 86 from the digital values representative of the settings of generators 54 and 56, respectively. Based upon the range of pulse width values available for controlling the speed of raising and lowering and the error signal, processor 86 calculates the raise or lower pulse width values when the raise and lower feeder subroutines (steps 282 and 284) are called. Thus, for a very high error signal values, processor 86 will use the maximum pulse width values, and for an error signal value approaching zero, processor 86 will use a relatively short duration pulse width values.

Each time processor 86 goes through the control sequence represented in FIG. 4 and reaches step 354, the pulse width modulated signal having a width calculated when the raise or lower subroutine is called, is applied to the appropriate AND gate 188 or 190 depending upon whether or not implement 22 is to be raised or lowered. If implement 22 is to be raised, AND gate 188 is pulsed by processor 86 to drive coil driver 184 which pulses valve solenoid 80 of valve assembly 32 to pressure lift cylinders 40 and thereby raise implement 22. If implement 22 is to be lowered, processor 86 applies a pulse width modulated signal to AND gate 190 which applies the pulse width signal to coil driver circuit 186 which pulses valve solenoid 82 of valve assembly 32 to allow hydraulic fluid to flow from lift cylinders 40 and thereby lower implement 22. Subsequent to pulsing the appropriate gate 188 or 190, processor 86 goes back to step 250 and executes the control sequence represented in FIG. 4.

It will be understood that the description above is of the preferred exemplary embodiment of the invention and that the invention is not limited to the specific forms shown and described. For example, the control system is disclosed in reference to a grain harvesting device; however, the system may also be utilized with other harvesting devices such as cotton pickers. Furthermore, depending upon the application, the various communication links which are hardwired for data and signal communication could be replaced with appropriate wireless communication hardware. Another modification to the system includes providing a potentiometer 36 and skid arrangement 202 at both ends of implement 22 and coupling the second potentiometer to an eight input multiplexer 96. Using this arrangement, processor 86 can be programmed to monitor both potentiometers 36 and use the signals from both potentiometers 36 to control the location of implement 22. For example, processor 86 may be programmed to generate a height value for implement 22 relative to surface 23 by (1) averaging the signals from potentiometers 36, (2) using the greatest value from potentiometers 36, or (3) using the lowest value from potentiometers 36. Since implement 22 can typically be over 30 feet long, and surfaces 26 can be relatively uneven over such a width, implement 22 location control can be improved by using more than one location sensor such as discussed above. As a further modification, a plurality of potentiometers (e.g. four) and skid arrangements 202 could be spaced along implement 22, where a logic circuit is coupled to the potentiometers and only outputs the value from the potentiometer associated with the lowest portion of implement 22 to circuit 96.

Other substitutions, modifications, changes and omissions may be made in the design and arrangement of the preferred embodiment without departing from the spirit of the invention as expressed in the appended claims.

What is claimed is:

1. An agricultural vehicle for operation on a surface, the vehicle comprising:

a support structure for supporting the components of the vehicle;

an operator cab supported by the support structure and including an interior for housing an operator of the vehicle;

an implement movably supported by the support structure;

an implement positioner coupled to the structure and the implement to move the implement relative to the vehicle in response to electric control signals;

a transducer coupled to the implement to produce location signals representative of a location of the implement relative to a selected reference point;

an electronic display located for viewing from within the interior of the cab; and a control circuit coupled to the implement positioner, the transducer, and the electronic display, and configured to monitor the location signals, apply display signals representative of one of the location signals to the display, and apply control signals to the implement positioner, the display displaying human-recognizable indicia representative of the location of the implement relative to the selected reference point in response to display signals.

2. The vehicle of claim 1, wherein the control circuit comprises an analog-to-digital conversion circuit configured to convert the location signals to digital position data.

3. The vehicle of claim 2, wherein the transducer is a potentiometer mechanically coupled between the implement and the vehicle, and electrically coupled to the analog-to-digital conversion circuit.

4. The vehicle of claim 1, wherein the electronic display is an LCD configured to generate human-recognizable indicia which include characters representative of the location.

5. The vehicle of claim 4, wherein the characters are numerical.

6. The vehicle of claim 1, wherein the selected reference point is the vehicle and the location signals are representative of the locations of the implement relative to the vehicle.

7. The vehicle of claim 1, wherein the selected reference point is the surface and the position signals are representative of the locations of the implement relative to the surface.

8. The vehicle of claim 1, wherein the implement is a harvesting device.

9. The vehicle of claim 8, wherein the vehicle is a combine operable in a forward direction and the harvesting device is located at a forward-most end of the vehicle relative to the first direction.

10. The vehicle of claim 2, wherein the implement comprises a skid which contacts the surface, and the transducer is a potentiometer mechanically coupled to the implement and the skid, and electrically coupled to the analog-to-digital conversion circuit, and the selected reference point is the surface, the location of the implement being the distance between the implement and the surface.

11. The vehicle of claim 10, wherein the electronic display is an LCD configured to generate human-recognizable indicia which includes characters representative of the distance between the implement and the surface.

12. The vehicle of claim 1, wherein the positioner includes at least one hydraulic cylinder mechanically coupled between the implement and the vehicle, and the transducer is a pressure transducer disposed to sense fluid pressure applied to the cylinder, the location of the implement being represented by the force at which the surface is supporting the implement.

13. The vehicle of claim 12, wherein the electronic display is an LCD configured to produce numerical characters representative of the force at which the surface is supporting the implement.

14. An agricultural vehicle for operation on a surface, the vehicle comprising:

a support structure for supporting the components of the vehicle;

an operator cab attached to the support structure and including an interior for housing an operator of the vehicle;

an implement movably supported by the support structure;

an implement positioner coupled to the structure and the implement to move the implement relative to the vehicle in response to electric control signals;

a first transducer coupled to the implement to produce position signals representative of the locations of the implement relative to the vehicle;

a second transducer coupled to the implement to produce location signals representative of a relationship of the implement relative to the surface;

an electronic display located for viewing from within the interior of the cab; and a control circuit coupled to the implement positioner, the first transducer, the second transducers and the electronic display, and configured to monitor the position and location signals, apply display signals representative of at least one of the position and location signals to the display, and apply control signals to the implement positioner, the display displaying human-recognizable indicia representative of the location of the implement relative to the vehicle in response to display signals representative of the position signals and displaying human-recognizable indicia representative of the relationship of the implement relative to the surface in response to display signals representative of the location signals.

15. The vehicle of claim 14, wherein the control circuit comprises an analog-to-digital conversion circuit configured to convert the position signals to digital position data and the location signal to digital location data.

16. The vehicle of claim 15, wherein the first transducer is a potentiometer mechanically coupled between the implement and the vehicle, and electrically coupled to the analog-to-digital conversion circuit.

17. The vehicle of claim 14, wherein the electronic display is an LCD configured to display indicia including numerical characters representative of the location.

18. The vehicle of claim 14, wherein the implement comprises a skid which contacts the surface, and the second transducer is a potentiometer mechanically coupled to the implement and the skid, and electrically coupled to the analog-to-digital conversion circuit, the relationship of the implement relative to the surface being the distance between the implement and the surface.

19. The vehicle of claim 18, wherein the electronic display is an LCD configured to display indicia including characters representative of the distance between the implement and the surface.

20. The vehicle of claim 14, wherein the positioner includes at least one hydraulic cylinder mechanically coupled between the implement and the vehicle, and the second transducer is a pressure transducer disposed to sense fluid pressure applied to the cylinder, the relationship of the implement relative to the surface being the force at which the surface is supporting the implement.

21. The vehicle of claim 18, wherein the electronic display is an LCD configured to produce numerical characters representative of the force at which the surface is supporting the implement.

22. The vehicle of claim 14, wherein the vehicle is a combine operable in a forward direction and the implement is a harvesting device located at a forward-most end of the vehicle relative to the first direction.

\* \* \* \* \*